United States Patent
Chan et al.

(10) Patent No.: US 9,256,632 B2
(45) Date of Patent: Feb. 9, 2016

(54) TEMPORALLY-CORRELATED ACTIVITY STREAMS FOR CONFERENCES

(71) Applicant: Oracle International Corporation, Redwood Shores, CA (US)

(72) Inventors: Eric S. Chan, Fremont, CA (US); Kiran Vedula Venkata Naga Ravi, Belmont, CA (US); Mikhail Romanov, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/462,419

(22) Filed: Aug. 18, 2014

(65) Prior Publication Data

US 2014/0358936 A1    Dec. 4, 2014

Related U.S. Application Data

(63) Continuation of application No. 13/111,894, filed on May 19, 2011, now Pat. No. 8,812,510.

(51) Int. Cl.
| | |
|---|---|
| G06F 7/02 | (2006.01) |
| G06F 17/30 | (2006.01) |
| G11B 27/034 | (2006.01) |
| H04L 12/18 | (2006.01) |
| H04N 7/14 | (2006.01) |
| G11B 27/30 | (2006.01) |
| H04N 7/15 | (2006.01) |

(52) U.S. Cl.
CPC .... *G06F 17/30336* (2013.01); *G06F 17/30044* (2013.01); *G06F 17/30817* (2013.01); *G11B 27/034* (2013.01); *G11B 27/3063* (2013.01); *H04L 12/1831* (2013.01); *H04N 7/147* (2013.01); *H04N 7/15* (2013.01); *H04N 7/155* (2013.01)

(58) Field of Classification Search
CPC ........ H04N 7/15; H04N 7/155; H04L 65/403; H04L 12/1831; G06F 17/30023; G06F 17/30044
See application file for complete search history.

(56) References Cited

U.S. PATENT DOCUMENTS

| | | | |
|---|---|---|---|
| 5,786,814 | A | 7/1998 | Moran et al. |
| 7,466,334 | B1 | 12/2008 | Baba |

(Continued)

OTHER PUBLICATIONS

Current Claims of International Application No. PCT/US11/37443 dated Jan. 2012 (5 pages).

(Continued)

*Primary Examiner* — Bruce Moser
(74) *Attorney, Agent, or Firm* — Hickman Palermo Becker Bingham LLP

(57) ABSTRACT

Techniques are provided for capturing events and activities that occur during a conference, generating metadata related to the events, and correlating the metadata with specific points in time, within the conference, at which the corresponding events occurred. The resulting temporally-correlated event metadata may be stored as part of the conference recording, or separate from the conference recording. Once the temporally-correlated event metadata has been stored for a conference, the conference may be indexed based on the metadata. The index may then be used to not only to locate a conference that satisfies specified search criteria, but to identify the points or snippets, within the conference, that correspond to the search criteria.

20 Claims, 4 Drawing Sheets

(56) References Cited

U.S. PATENT DOCUMENTS

| | | |
|---|---|---|
| 8,553,067 B2 | 10/2013 | Shaffer et al. |
| 2006/0101022 A1 | 5/2006 | Yu et al. |
| 2007/0239825 A1* | 10/2007 | Walter .......................... 709/204 |
| 2008/0049922 A1* | 2/2008 | Karniely ............... H04M 3/562 379/205.01 |
| 2010/0318399 A1* | 12/2010 | Li ..................... G06Q 10/1093 705/7.18 |
| 2011/0043597 A1* | 2/2011 | Greenwood ............. H04N 7/15 348/14.08 |
| 2011/0225013 A1 | 9/2011 | Chavez et al. |
| 2012/0128322 A1 | 5/2012 | Shaffer et al. |
| 2012/0150863 A1 | 6/2012 | Fish et al. |
| 2012/0212571 A1 | 8/2012 | Wang et al. |
| 2012/0243848 A1* | 9/2012 | Martin .......................... 386/241 |

OTHER PUBLICATIONS

Arnold, S. "Could Google Become the Semantic Web" downloaded from the Internet on Jun. 14, 2012, 4 pages.

"Notification of Transmittal of the International Search Report" received in International Application No. PCT/US11/37443 dated Jan. 27, 2012 (11 pages).

\* cited by examiner

TEMPORALLY-CORRELATED ACTIVITY STREAMS FOR CONFERENCES

CROSS-REFERENCE TO RELATED APPLICATIONS

This application is a continuation of U.S. patent application Ser. No. 13/111,894 filed May 19, 2011, now U.S. Pat. No. 8,812,510, which is incorporated herein by reference in its entirety.

FIELD OF THE INVENTION

The present invention relates to recorded conferences and, more specifically, to techniques for temporally correlating specific portions of conference recordings with activities that occurred during the conferences.

BACKGROUND

It is becoming increasingly common to use computer technology to conduct and/or record conferences. A "conference", as used herein, is any form of interaction that takes place between two or more participants during one or more specified periods of time. Conventional types of conferences include in-person meetings, phone conferences and video conferences. However, as new technology becomes available, new forms of conferences have been developed. Thus, the interactions that constitute a conference can occur without using technology to facilitate the interaction (e.g. sitting around a conference table), using technology to facilitate the interaction (e.g. phone, video or web conferencing), and/or immersed within technology (e.g. interactions between avatars in a virtual world). For example, co-browsing the Internet, over-the-web multi-media presentations, interactions during a "quest" between players of an online game, an interactive lecture in a distance learning management system, are merely some examples of the myriad new forms of conferencing that have been developed in the relatively recent past.

New technology has not only resulted in new forms of conferencing, but has also eliminated the need for all participants to be physically present in the same location. For example, it is now common for business meetings to include one or more remote participants, or for all participants to be spread across the continent or around the world.

Conferences are often recorded for parties that are unable to attend the conferences. Even when all parties are able to attend, it is common for conferences to be recorded for later reference by the original participants or third parties. Once a set of conferences has been recorded, the usefulness of the conference recordings is largely dictated by how easily users are able to (a) locate the recordings of conferences in which they are interested, and then (b) locate content, within the conference recordings, in which the users are interested.

One way to locate the conference recordings in which one is interested is to search through the recordings based on metadata associated with the recordings. For example, audio conference recordings may take the form of digital audio files. Each digital audio file will typically have metadata such as a filename, file size, and file creation date. Using such metadata information, users may be able to identify the conference recording in which they are interested. For example, if a user knows that a particular presentation was given at a board meeting in March 2011, the user can search for the file that has "board" in the filename and has a file date that falls in the month of March 2011.

Unfortunately, file metadata is not always helpful in locating desired information in conference recordings. For example, a user may be interested in discussions about a particular topic, but not know when, or in which type of meetings, the topic was discussed. In such a situation, if file metadata were all the information available for locating the correct conference recordings, the user would be out of luck.

Due to the limitations of finding desired information from conference recordings based on file metadata alone, technologies have been developed for associating additional metadata with the conference recordings. Such additional metadata may be added manually after a conference has been recorded. For example, a designated user may listen to the conference recordings and "tag" the conference recordings with keywords that describe the topics being discussed. However, after-the-fact manual generation of keyword metadata is so time consuming as to be virtually infeasible for large sets of conference recordings.

To avoid the overhead of after-the-fact manual tagging, technologies have been developed for analyzing the media contained in conference recordings, such as audio, video, streaming media, to automatically supplement the file metadata of the conference recordings with automatically-generated metadata. Examples of technologies that may be used to automatically generate after-the-fact metadata for a conference include speech recognition, optical character recognition, natural language processing, information retrieval of captions, etc. The automatically-generated metadata that is produced by analyzing a particular conference recording is associated with the conference recording so that the automatically-generated metadata may be used as the basis for user searches.

For example, assume that a particular document was displayed during a video conference. An analysis tool may analyze the recording of the video conference, detect that a document is being displayed in the video, perform optical character recognition on a frame of the video that includes the document to obtain text from the document, determine which words within the text are keywords, and associate those keywords with the conference recording. After those keywords have been associated with the conference recording, a user could locate the conference recording by performing a search that involves one or more of those keywords.

Unfortunately, systems that automatically generate after-the-fact metadata for conference recordings are computation intensive and require tedious calibrations to recognize the contents of the multimedia streams. Typically, such systems are not robust and scalable enough for large scale deployments. Consequently, search results of conference recordings based on existing technologies are not effective. Search results often return the conference recordings whose titles, descriptions, and tags match the search strings. Even with intelligent systems as described above, the search results are often the entire video stream of a conference recording, which is coarse-grained. Specifically, even when users are lucky enough to locate, based on a comparison between their search terms and automatically-generated metadata, a conference recording that has information in which they are interested, the users are still typically required to scan through the video of the conference recording to identify the relevant sections. When the conference is long, scanning the video to locate the relevant sections may be extremely tedious and time consuming.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
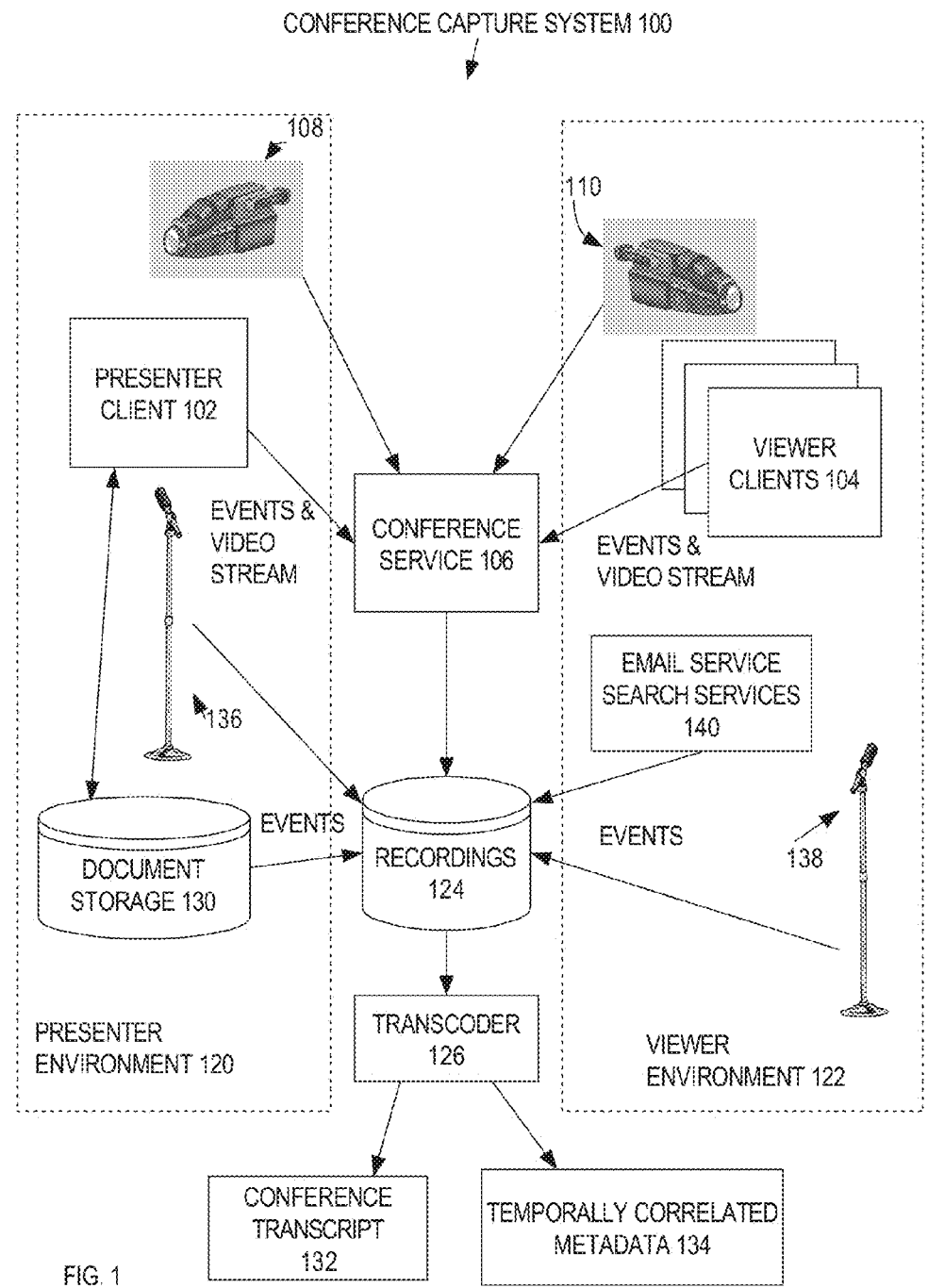
FIG. 1 is a block diagram of a system for capturing activities relating to a conference, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for capturing events and activities that occur during a conference, generating metadata related to the events, and correlating the metadata with specific points in time, within the conference, at which the corresponding events occurred. The resulting temporally-correlated event metadata may be stored as part of the conference recording, or separate from the conference recording. Once the temporally-correlated event metadata has been stored for a conference, the conference may be indexed based on the metadata. The index may then be used to not only to locate a conference that satisfies specified search criteria, but to identify the points, within the conference, that correspond to the search criteria.

In one embodiment, a conferencing service logically stores artifacts, along with associated metadata such as policies, rules, security, member users, member groups, member roles, in a "workspace". Such a collaboration workspace can represent a project. A project workspace can contain folders and artifacts. Folders include inboxes, calendars, task lists, forums, libraries, conferences, and chat rooms. These folders can contain artifacts such as documents, messages, tasks, calendar events, wiki pages, discussion messages, conference transcripts, chat transcripts, etc. A workspace can represent a context or scope of a durable conference. A durable conference is a context for real-time conference sessions. One can start and stop a series of sessions of a durable conference. Modeling a conference as a folder in a project workspace accentuates the durability of the conference. A conference folder can contain conference transcripts, which are artifacts containing recordings of conference sessions. When a conference session of a conference in the workspace is started, participants (presenter and attendees) are provided tools to create, display/present and edit artifacts of the workspace through conferencing client software. For example, a conference presenter can present a spreadsheet document that is stored in the workspace directly from the conference. The participants are not limited to creating displaying/presenting, and editing artifacts in the conference workspace—they can create, display/present, and edit artifacts in any related, unrelated, or personal workspaces. A conference workspace serves as a context or scope of a conference for implicitly determining whether an activity to load, create, update, delete, move, or in general act on an artifact by a participant during a conference is relevant to the conference. In some cases, the activity may be relevant but private to the individual participant, so the activity is not visible in the purview of other participants.

During the course of conference, participants may perform actions such as displaying or discussing a document, creating an item in the spreadsheet (co-edit), performing a demonstration, etc. Each of the actions is recorded as an activity by the server. At the end of the conference, the conference server has a conference recording and a stream of activities. The activity stream is a recorded snapshot copy of the activities and hence may remain in the system even if the effect of the activities are purged for any reason.

There are several ways in which the multimedia conference transcripts and activity streams can be formatted, presented, and accessed by the users. For example, as shall be described in greater detail below, an interface is provided that allows a user to click on an activity in the activity streams to jump to the "offset" in the conference recording, and then replay the recording to span the event of the activity.

Conference Capture System

Referring to FIG. 1, it represents a conference capture system 100 configured according to an embodiment of the invention. System 100 records an activity stream that occurs during a conference, and correlates activity records within the activity stream with points within a recording of the conference (the "conference transcript"). Depending on the nature of the conference the conference transcript may include many different forms of information, including audio, video, animations, images, documents and text.

As used herein, the term "activity stream" refers to a time based sequence of activity records for a specific set of users, or a time-range, or both. The term "activity record", in turn refers to a record that corresponds to some activity or event that occurs during a conference. In one embodiment, each activity record within the activity stream has the form (user, {artifact}, timestamp, operation), where "artifact" is any item involved in the operation that triggered the creation of the activity record. When the operation is performed using a computing device, the artifact is typically an electronic item, such as a document. Artifacts are often produced out of a collaborative activity (e-mail, chat, conference, discussion, shared documents, engineering drawings, business process workflows, wikis, blogs etc).

System 100 generally includes a presenter client 102, a conference service 106 and a set of viewer clients 104. Conference service 106 is a component or set of components responsible for hosting conference sessions. In one embodiment, a conference session is an instantiation of a conference object during runtime.

Presenter client 102 and viewer clients 104 are collectively referred to herein as conferencing clients. A conferencing client is a component or set of components responsible for providing access to the collaboration tools supported by a conference session. A conferencing client may, for example, be implemented as a desktop application or a rich web client.

While a conference session is running, users can connect to the conference session via a conferencing client and communicate with other connected clients via collaboration protocols supported by the conference session (e.g. desktop sharing, text chat, voice chat, whiteboard, co-browsing, co-editing, etc.) and visualized by the conferencing client. Any protocol supported by the conference session can be recorded in the persistent storage.

During a typical conference, content that is displayed on presenter client 102 is sent to conference service 106, which causes the same content to be concurrently displayed on viewer clients 104. While FIG. 1 illustrates an embodiment in which clients are specifically designated to be presenters or viewers, in alternative embodiments all clients may be both presenters and viewers. For example, each client may be the source of some information that is displayed to all other clients.

In yet another embodiment, the role of presenter may be passed between the clients while the conference is in session, such that the conferencing client of the user that is currently-designated to be the presenter dictates what is displayed on the conferencing clients of all other conference participants.

In yet another embodiment, the display generated by a single computing device is visible to all participants of the conference (e.g. via a projector). In such a scenario, the presenter controls the computing device to specify what the conference participants see without the need for additional conferencing clients.

The techniques described herein are not limited to any particular presentation/viewer client configuration. In fact, some conferences may not even involve presenting content using any computing device. Such "offline" conferences may still be captured through the use of video cameras and/or audio recordings, and the techniques described hereafter may be used as long as activities captured during the conference are temporally-correlated with the recording(s) of the conference.

Peer-To-Peer Conferencing

System 100 generally represents a conferencing system in which conferencing service 106 acts as a centralized orchestrator of the viewer clients 104. However, the techniques described herein are not limited to any particular type of conferencing architecture. For example, the techniques described herein may be applied equally to conferencing solutions/tools that are implemented with peer-to-peer protocols without involving a conferencing service. Thus, alternative embodiments include alternative system designs, such as conferencing tools implemented with peer-to-peer protocols.

Figure 3:
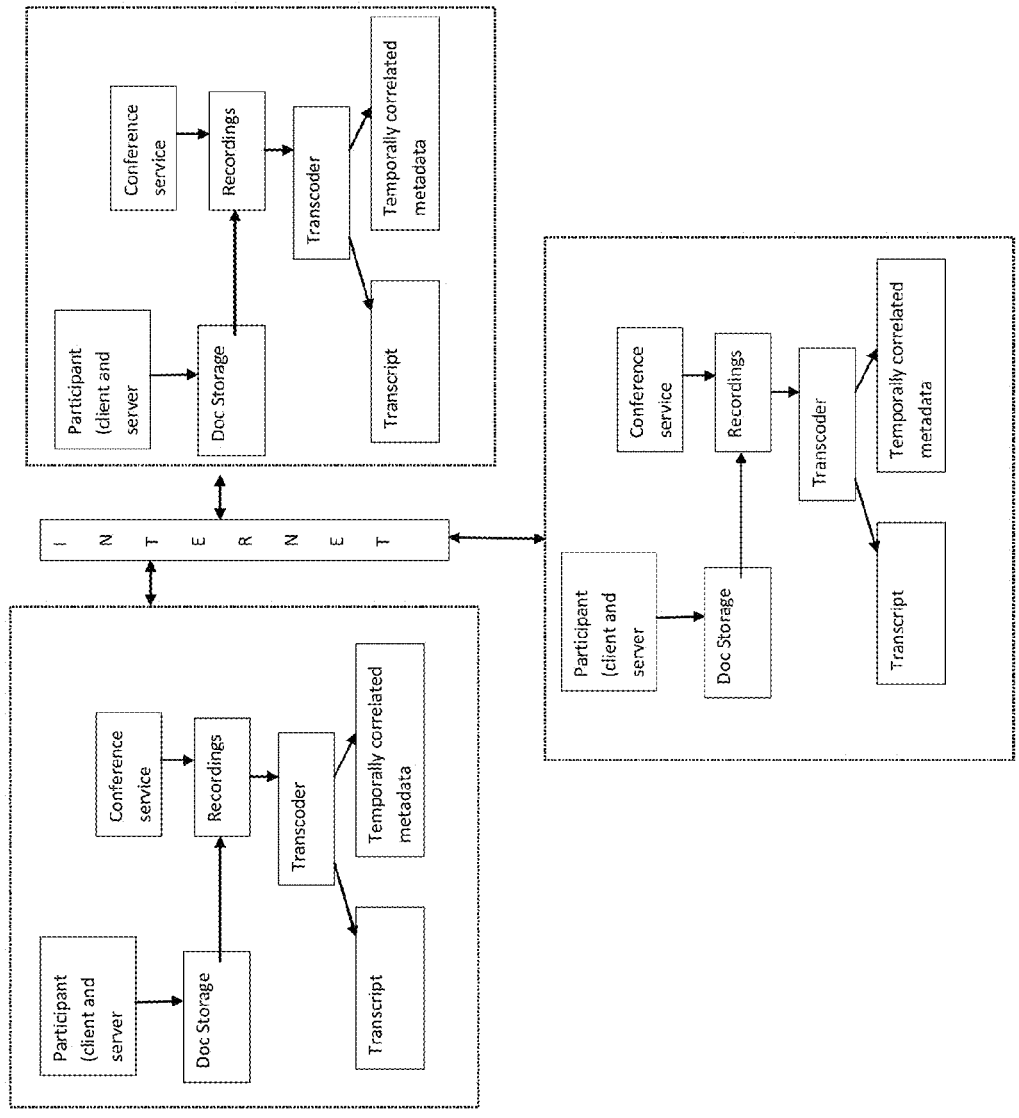
FIG. 3 is a block diagram of a peer-to-peer system for capturing activities relating to a conference, according to an embodiment.

For example, FIG. 3 illustrates a peer-to-peer (P2P) system 300 where each node includes a conferencing client as well as server software. This system 300 is a logical extension to the model depicted in FIG. 1. Specifically, in system 300, each node works both as a client and a server and maintains a local copy of the conference transcript, the temporal metadata and records the temporal metadata into the node's database. The events and video are streamed over a network, such as a LAN, WAN, or the Internet. The specific embodiment illustrated in FIG. 3 illustrates a scenario in which the events and video are streamed over the Internet. In one embodiment, local conference nodes maintain the recordings locally by aggregating events and video stream from other nodes that participate in the conference.

It should be noted that, for convenience, peer-to-peer system 300 has been described with reference to conferencing nodes that have both client and server software. However, a pure P2P network does not have a notion of clients or servers, but only equal peer nodes that simultaneously function as both "clients" and "servers" to the other nodes on the network.

System 300 may employ various P2P conferencing tools to facilitate the P2P conferencing, and the techniques described herein are not limited to any particular P2P conferencing tools. For example, system 300 may use technologies such as peercasting for multicasting streams to synchronize the conference streams and activity streams among the peers. As another example, system 300 may use P2P file sharing/content delivery tools and streaming media tools to delivery conference transcripts from a conference folder to the peers in the P2P network.

Capturing the Activity Stream

Frequently, many activities take place during a conference. System 100 includes mechanisms to capture and record the activities that occur during a conference. In the embodiment illustrated in FIG. 1, those mechanisms include mechanisms for capturing activities that occur in the presenter environment 120, and mechanisms for capturing activities that occur in the viewer environment 122. The mechanisms for capturing activities that occur in the presenter environment 120 include presenter client 102, document storage 130, camera 108, and microphone 136. The mechanisms for capturing activities that occur in the viewer environment 122 include viewer clients 104, camera 110, and microphone 138.

As shall be described in greater detail hereafter, these are merely examples of the virtually unlimited number and types of mechanisms that may be used to capture activities that occur during a conference. The techniques described herein are not limited to any particular type of activities, nor to any particular type of mechanisms for capturing those activities.

Some of the activities that occur during a conference relate directly to the conference. For example, loading a spreadsheet into the presenter client 102 so that all of the viewer clients 104 display the spreadsheet to the conference participants is an activity that directly relates to the conference. On the other hand, there are also many activities that occur during a conference that relate less directly to the conference. For example, while a conference is in session, one of the participants may use her respective viewer client 104 to send an email that may not be related to the topic of the conference.

Because some of the activities that participants engage in during a conference may not be related to the conference, system 100 may be configured to automatically differentiate between activities that are relevant to the conference (e.g. loading a spreadsheet by a client to present the spreadsheet to the viewer clients) and activities that are irrelevant to the conference (e.g. a participant sending personal email).

For example, in one embodiment, the workspace that contains a conference is used by system 100 as an indicator of the context or scope of a conference session to determine whether an artifact loaded, created, updated, deleted, moved, or in general acted on by a participant during a conference is relevant to the conference. Specifically, in one embodiment, an activity is deemed relevant to a conference if the activity (a) involves an artifact that is part of the conference workspace, (b) involves a participant of the conference, and (c) occurs during the time period in which the conference is being held. On the other hand, activities that involve accessing an artifact in a workspace not related to the conference can be deemed as not relevant to the conference. However, taking notes of the conference in a personal workspace, which is outside the scope of the conference workspace, should be treated as private to the participant and visible only in the purview of the participant. In the purview of other participants, such private activities of an individual participant that fall outside the scope of the conference workspace are effectively not relevant to the conference.

According to one embodiment, each activity-capturing mechanism is configured to send information about those activities so that the timing of those activities may be correlated with the conference recorders. The activity-capturing mechanism may determine whether the activity is relevant to the conference and send information about the activities that are relevant to the conference for correlation. The activity-capturing mechanism may filter out activities not relevant and not send them to the conference recorder. In one embodiment, each of the activity-capturing mechanisms generates an activity record in response to occurrence of an activity. The activity record that is generated for each activity includes (a) data that identifies the activity that occurred, (b) time information that allows the activity to be temporally-correlated with the conference, and (c) the scope or context of the activity and its relevance to the conference.

As mentioned above, in one embodiment activity records have the form: [(user, {artifact}, timestamp, operation), workspace], where "user" is data that identifies the person that was involved in the activity, "artifact" is data that identifies any item that was involved in the activity, "timestamp" is data that identifies when the activity occurred, "operation" indicates what type of activity occurred, and "workspace" is data that identifies the context or scope of a subset of artifacts or the operation on a subset of artifacts ({artifact} in the tuple represents a set of artifacts).

The nature of an activity may determine whether the user that performed the activity can be identified. For example, many conference systems require conference participants to log in to the conference. Based on the log-in information, the conferencing service is typically able to identify which users perform activities within the conference context itself. However, for activities that occur during the conference, but outside the knowledge or control of the conferencing service, identification of the specific user that performed the activity may not be possible.

In an embodiment where activity records have the form: [(user, {artifact}, timestamp, operation), workspace] a user sending an email during a conference may, for example, cause generation of the activity record that indicates:

Mary performed the activity
The activity involved an email with email.id=452
The activity occurred at 10:12 am
The activity was sending the email to Fred
The activity was CC'ing the email to a particular workspace In this example, when sending an email to Fred during a conference, Mary CC'ed the email to the conference workspace. In one embodiment, this CC'ed email ties the email messaging activity to the conference context and renders the activity relevant to the conference recording when the activity occurs during a conference session.

In addition to indicating that the activity was sending the email to Fred, the operation data may include the content of the email, keywords extracted from the content, an indication of who was copied on the email, data about attachments on the email, etc. There is no limit to the type or amount of information that an activity record may have about the activity the activity record represents.

Further, the amount and type of information that an activity record has about the corresponding activity is also dictated by the nature of the activity, and the mechanism used to capture the activity. For example, while document storage 130 may be able to identify a document retrieved by presenter client 102 during a conference, it may not be possible to identify who is responsible for a cough that was picked up by microphone 138 during the conference. As another example, a sensor configured to detect when a door to the conference room opens and closes may be able to generate activity records in response to the opening and closing of the door, but would generally not be able to identify which conference participant actually performed those operations. Radio Frequency Identification (RFID) devices may be used to enhance the identification of actors and artifacts in the activity recording data.

The activity records that are generated by the various activity-capturing mechanisms make up the activity stream of the conference. In system 100, that activity stream and the conference transcript produced by the conference service 106 are collected and stored as recordings 124. Because the activities represented in the activity stream (a) occurred during the conference, and either (b) were performed by conference participants, or (c) were captured by activity-capturing mechanisms that were disposed in the software environments and/or physical environments in which the conference occurred, it may be assumed that the activities relate either directly or indirectly to the conference, and may be of interest to later users of conference recordings.

Services that Generate Activity Lists

As explained above, in one embodiment, the conference service 106 instantiates and runs a conference session. In addition, conference service 106 records collaboration protocols on persistent storage, and the recorded data is time stamped. Further, the conference service 106 records conference-related activities performed by users in the conference session (for example start/stop/switch of the user sharing his/her desktop (aka presenter)) into conference session activity stream. Thus, the conference service 106 is one component that generates activity lists for a conference.

Because the conference service 106 is managing the conference, the activity list generated by conference service 106 for activities that occur during the conference (the "conference session activity stream") are known to be associated with the conference. However, additional services may also generate activity lists. For example, a workspace service, as well as other services capable of recording activity lists, may record service-specific user activities. For example, in one embodiment, the workspace service generates activity records in response to creation, update, and removal of documents and folders. The activity streams generated by services other than the conference service 106 are referred to herein as out-of-band activity streams.

In some situations, the services that generate out-of-band activity streams do so without knowing exactly which activity records belong to which conferences. For example, when multiple conferences are being held concurrently, the out-of-band activity stream generated by a workspace server may include activities that occurred during many different conferences. Consequently, out-of-band activity streams may need to be filtered prior to being combined with the conference session activity stream, as shall be described in greater detail hereafter. In one embodiment, workspace context of the actors and artifacts in the activity record can be used to filter the relevant activities from the out-of-band activity streams.

The Trans-Coding Service

The recordings 124 of the conference, including the various activity streams, are provided to a transcoder 126. Transcoder 126 generally represents hardware and/or software to implement a transcoding service that creates documents in a playable format from the data recorded in the conference session. In the illustrated embodiment, transcoder 126 produces both a playable conference transcript 132 and temporally-correlated metadata 134. However, in alternative embodiments, the temporally-correlated metadata 134 may be combined in the same playable file as the conference transcript 132.

In one embodiment, when a conference session is ended, the transcoding service extracts the following information from the conference session activity stream:

start and end timestamps of the conference session
list of users participated in the conference session time-stamp pairs corresponding to {start presenting, stop presenting} activities, user information for these entries.

Based on the information extracted from the conference session activity stream, the transcoding service creates an Active Presenter Timestamps List (APTL). In addition, the transcoding service collects out-of-band activity streams generated from other sources. For example, the transcoder collects out-of-band activity streams generated by the workspace service and other services, and extracts entries with time-stamps falling between the start and end of the conference session. From those out-of-band activity streams, the transcoding service extracts (a) activities performed by users that participated in the conference session, and (b) activities captured by activity-capturing mechanisms specifically associated with the conference. An activity-capturing mechanism that is specifically associated with a conference may be, for example, a microphone disposed in the room known to have been used for the conference.

The transcoding service then combines the conference session activity stream with the filtered streams from the other sources to produce a Full Activity Stream (FAL) for the conference. According to one embodiment, the transcoding service may further organize and/or filter the information contained in the FAL. For example, using the APTL, the transcoding service may extract activities performed by the active presenters during their presentation from the FAL and create an Active Presenter Activity List Stream (APAL). The transcoding service then generates a playable file from the recorded collaboration protocol data. The playable file may be in a standard media format, or a custom format usable by the playback service.

According to one embodiment, while generating the playable file, the transcoding service:
  inserts appropriate Annotations for all entries in the APAL stream
  records offsets (in time units of the playable stream) for all APAL entries and creates the Active Presenter Reference List (APRL).

Temporally Correlated Metadata

Temporally correlated metadata 134 generally represents metadata that indicates activities that occurred during a conference, and the location, within the conference transcript 132, that corresponds to the time at which each of the activities occurred. For example, assume that a conference started at 10:00 am and ended at 11:00 am. Assume further that a door sensor detected that a door to the room in which the conference was taking place opened at 10:12 am. Under these circumstances, the activity stream for the conference would include an activity record for the door opening, and the resulting temporally-correlated metadata 134 would include data that correlates the opening of the door with the location, within the conference transcript 132, that corresponds to 10:12 am.

The correlation between the temporally-correlated metadata 134, and specific points within the conference transcript 132, may be maintained in a variety of ways. For example, timestamps may be stored at locations within the conference transcript 132 to indicate the actual time at which those locations within the transcript were recorded. In a system in which timestamps are located with the conference transcript, the temporally-correlated metadata 134 may be correlated with the transcript by storing timestamp information for each of the activities represented in the metadata.

For example, assume that a timestamp that indicates 10:12 am is located at an offset X within a video file that serves as the transcript of a video conference. If the metadata associated with that conference indicates that a door opened at 10:12 am, that opening of the door is temporally-correlated with the transcript of the video conference because it is possible to locate (at offset X), the specific portion of the conference transcript that was recorded at the time that the door opening was captured.

Rather than maintain timestamps for both the conference transcript 132 and the temporally-correlated data, transcoder 126 may initially determine the temporal correlation between the conference recording the activity records, and store the correlations in terms of offsets into the conference recording. For example, assume that an activity occurs while a conference is being recorded. In response to detection of the activity, an activity record is generated. However, rather than store a timestamp with the activity record, it may be possible to determine the current size of the conference recording. The current size of the conference recording may be stored with the activity record. After the conference recording is complete, that size value may be used as an offset into the conference recording to jump directly to the location, within the conference recording, that temporally corresponds to that activity.

These are merely two examples of how metadata that identifies activities that occurred during a conference can be temporally-correlated with the conference transcript such that, based on the metadata, it is possible to jump directly to the location within the conference transcript 132 that was recorded at the time any given activity occurred.

Activity-Monitoring Software

As mentioned above, activities that occur during a conference may be captured by various types of activity-capturing mechanisms. When the activities that are being captured are activities performed using computing devices, the activity-capturing mechanisms may take the form of software.

In one embodiment, software used to conduct a conference has built-in logic for detecting certain types of activities and for generating activity records for those types of activities. For example, presenter client 102 may have tools that allow a present to load a document, scroll within a document, transition between slides of a slideshow, engage in text chat with other participants, etc. When the presenter makes use of any of these tools, the presenter client 102 generates and sends an activity record for the activity. Similarly, the viewer clients 104 may provide tools through which conference participants may interact with the presenter and with each other. Each of the viewer clients 104 may be configured to generate and send activity records in response to its respective user making use of any of those tools.

Instead of, or in addition to, activity-record-generating conferencing clients, the computing devices used by the participants in a conference may include activity-monitoring software designed to monitor and generate activity records for activities that a user engages in using other software. For example, an activity-monitoring software program running on a viewer client 104 may detect when a user:
  sends an email
  makes a note
  sends an instant message
  loads a file
  begins playing solitaire Though the activity-monitoring software program is not the program that the user used to perform any of these activities, the activity-monitoring software program may generate and send the activity records for these activities.

Unfortunately, activity-monitoring software programs may not be able to capture all of the details about an activity that may be of interest to users. For example, an activity-monitoring software program may be able to detect that an email is sent, but may not be able to determine to whom it was sent, or what keywords were in its message. To obtain more detailed information about activities, the conference service 106 may provide an interface through which software that is not directly involved in a conference may submit activity records.

For example, while an email program may not be designed to generate activity records during normal operation, the email program may be configured to start generating activity records in response to receiving an indication that a conference has begun, and cease sending activity records in response to receiving an indicate that a conference has ended. The functionality for receiving those indications and generating activity records may be built into the email program itself, or may be added to the email program through a plug-in. In either case, because the software that is being used to perform the activity is involved in the generation of the activity record, the activity record may include more detailed information than would be available to a separate activity-monitoring software program.

In one embodiment, programs that are capable of generating activity streams register with the conferencing service, or the conferencing service to register with the programs. In either case, after registration, the conferencing service may then send messages to those programs to indicate when to start generating records, when to stop generating records, where to store the records, timing information to synchronize their timestamps with the conferencing service, a conference identifier to uniquely identify the conference that is taking place, the user identifier used by the conferencing service for the user, etc.

Activity-record-generating functionality is not limited to the software with which conference participants directly interact. For example, system 100 includes a document storage 130 that is configured to generate activity records whenever opens or closes a file during a conference. For example, the presenter may directly interact with presenter client 102 to load a spreadsheet during a presentation. In response to the user's request, presenter client 102 may send a request to document storage 130 for the spreadsheet. In response to the request, document storage 130 generates an activity record that indicates which type of file operation was requested, when the operation was requested, and which file was involved in the request. If the information is available to document storage 130, the activity record may include additional information such as which user requested the file, which application requested the file, and keywords contained within the file.

In addition to merely detecting activities, activity-record-generating software may perform complex analysis, where the outcome of the analysis is included in the activity records that they generate. For example, in response to detecting the opening of a door, a face recognition operation may be triggered using a video feed from a camera that is facing the door. If a face is positively identified, the identity of the person is included in the activity record generated for that door opening even.

As yet another example, in response to the presenter displaying a text document, the text of the text document may be automatically analyzed to identify keywords, and any keywords found may be included in the activity record that is generated in response to the document being displayed. Because the text is extracted directly from the document during the conference, and not by an after-the-fact analysis of the conference recording, the extraction will generally be more accurate and less computationally intensive.

In the case of a document for which only the image is available, the display of the document within the conference may trigger an optical character recognition routine that generates text from the image, and that text can be analyzed for keywords that can then be included in the appropriate activity record. However, even in such situations, optical character recognition based on the original image, rather than a frame of video in a conference recording, will tend to produce more accurate results.

Activity-Monitoring Sensors and Devices

Not all activities that occur during a conference are activities that are performed using software. In fact, some conferences may not involve using software at all. As long as a conference recording may be temporally-correlated with the times at which activities occur, it is possible to generate temporally-correlated metadata for a conference.

Referring again to FIG. 1, viewer environment 122 includes a microphone 138. While the audio picked up by microphone 138 may not be part of the conference itself, it may be relevant to future users. For example, assume that the conference is a student presentation given in a public speaking workshop. While the conference is in progress, microphone 138 may pick up applause, yawns, coughs, and out-of-band remarks made by audience members. Upon detecting those forms of audio input, activity records may be generated. Because those activity records are temporally-correlated with the recording of the speech itself, the student will be able to use the temporally-correlated metadata to directly jump to the parts of his speech that pleased or bored his audience.

Microphones 136 and 138 and video cameras 108 and 110 are merely examples of devices that can be used to detect user activities that do not involve the use of software. Other types of sensors include motion sensors, door sensors, light sensors, etc. There is virtually no limit to the types of sensors that may be used to detect and capture conference participant activities that do not involve the use of software. The techniques described herein are not limited to any particular type of sensors, devices, or participant activities.

Interval-Duration Activities

According to one embodiment, activities may be associated with specific points in time, or with intervals. In the case of interval-duration activities, each activity may be associated with a "start time" and "end time" to demarcate the interval for the activity. For example, the start and end of a "change of presenter" activity may respectively correspond to the time that a user assumes the presenter role (or grabs the mouse controls), and the time that another user assumes the present role (or grabs the mouse controls). For activities that involve intervals, the activity record indicates both the start time and the end time of the activity, or the start time and duration of the activity.

Example Activity Stream: Tagging and Annotating "Now"

In one embodiment, conferencing clients are configured with a tool that allows conference participants to "tag" the conference. However, unlike conventional tagging systems, the tags created by the conference participants using system 100 have a temporal dimension. Specifically, the tags are correlated with particular points in time within the conference, rather than with the conference as a whole.

For example, assume that a conference is a troubleshooting session between a computer user and a help desk operator. The conference service 106 may present to both participants the screen of the user that is experiencing problems. The conference session may be recorded for future reference. As the session is being recorded, the user demonstrates the trouble that the user is experiencing. During the demonstration by the user, the user may display a screen that illustrates a symptom of a problem. At the time that the user is showing the symptom within the conference, the user or the help desk monitor my select a control that assigns a "symptom" tag to that point in time within the conference.

As the session proceeds, the help desk monitor may walk the user through a series of operations until the root cause of the problem is discovered. At that point in the conference, one of the participants may tag that point of time in the conference with a "root cause" tag.

After the session has ended, the activity stream for the session will include an activity record that correlates the "symptom" tag with the point, within the conference recording, at which the symptom tag was created, and an activity record that correlates the "root cause" tag with the point, within the conference recording, at which the root cause tag was created.

In this example, the tags are to specific points in time within a conference, but are not specific to any particular artifact involved in the conference. In other situations, the tags may be created relative to both a specific time and a specific artifact. For example, rather than simply create a "symptom" tag that applies to a particular point in time in the conference, a conference participant may assign the tag to one of several files that are being displayed on the screen. In such a situation, the activity record for the tagging event would indicate both the time at which the tag was created and the file with which the tag was associated.

The specific types of tags that are made available to conference participants may be based on a variety of factors, including the nature of the conference and each particular participant's role. For example, in a help desk session, the user that has encountered problem may be provided with a set of predefined tags that include "symptom", but not "root cause". In contrast, the help desk operator may be provided a set of predefined tags that include "root cause". On the other hand, for a conference that is an online college course, the set of predefined tags may be entirely different from those provided during a help desk session. Such tags may include, for example, tags such as "start lecture", "end lecture", "questions and answers", etc.

As mentioned above, the tags applied during a conference need not be associated with any particular object. Thus, rather than using gestures such as "apply a red tag on a message", "apply a crash tag a heap dump file", or "apply a symptom tag on a log file", which specify a specific target object, tags may simply be associated with a particular time during the conference. Thus, users are able to make use of gestures such as "apply a red tag now", "apply a crash tag now", or "apply a symptom tag now" which employ a notion of "now" to represent the current time/in situ during a conference.

Instead of or in addition to providing predefined sets of tags, the conferencing software may provide participants with tools to define their own tags and annotations. Some of these user defined tags may be private to the user, i.e. the tags are visible only to the user who creates or applies the tag. For example, during a philosophy lecture, a student may be struck with a brilliant idea. In response, the student may create an annotation that records the student's thoughts. The creation of the annotation may constitute an "activity" that is recorded in the activity stream. In this case, the contents of the annotation may be part of the activity record for the annotation. Consequently, the student will not only have a recording of her idea, but a correlation between that idea and the point, within the lecture, at which the idea came to her. The student may define this tag as private for personal reference. If the student is confident that his is a truly brilliant idea, the student may change this tag to public, so other students and lecturers may see the idea conveyed by the tag.

Various tagging and annotation models and structures may be used, and the techniques described herein are not limited to any particular tagging model or structure. One example of annotation/tagging data structures that may be used to implement the techniques described herein are those developed by OASIS UIMA (see: docs.oasis-open.org/uima/v1.0/uima-v1.0.html), in particular the "TemporalAnnotation"and "Provenance" model.

With respect to annotations, tools may be provided to allow conference participants to annotate a conference session. Similar to tags, those annotations relate to the conference in general, or to specific items (e.g. a particular document). Whether or not the annotations relate to any specific item, the annotations are temporally-correlated with the conference. Consequently, those annotations can be used for indexing into the conference recordings.

In one embodiment, the annotations are entered, for example, by one or more participants through the chat/dialog channels of a real-time conference. According to one embodiment, within a chat channel, annotations are differentiated from comments that are not annotations by special gestures or by the notion of "now". For example, typing "the presenter is on slide one" into a chat box may be treated as a conventional comment, while typing "now, the presenter is on introduction slide" is be treated as an annotation that triggers generation of an activity record. In this example, beginning a sentence with the term "now," indicates to the conference service that the comment is intended to be treated as a conference annotation.

Playback System

Figure 2:
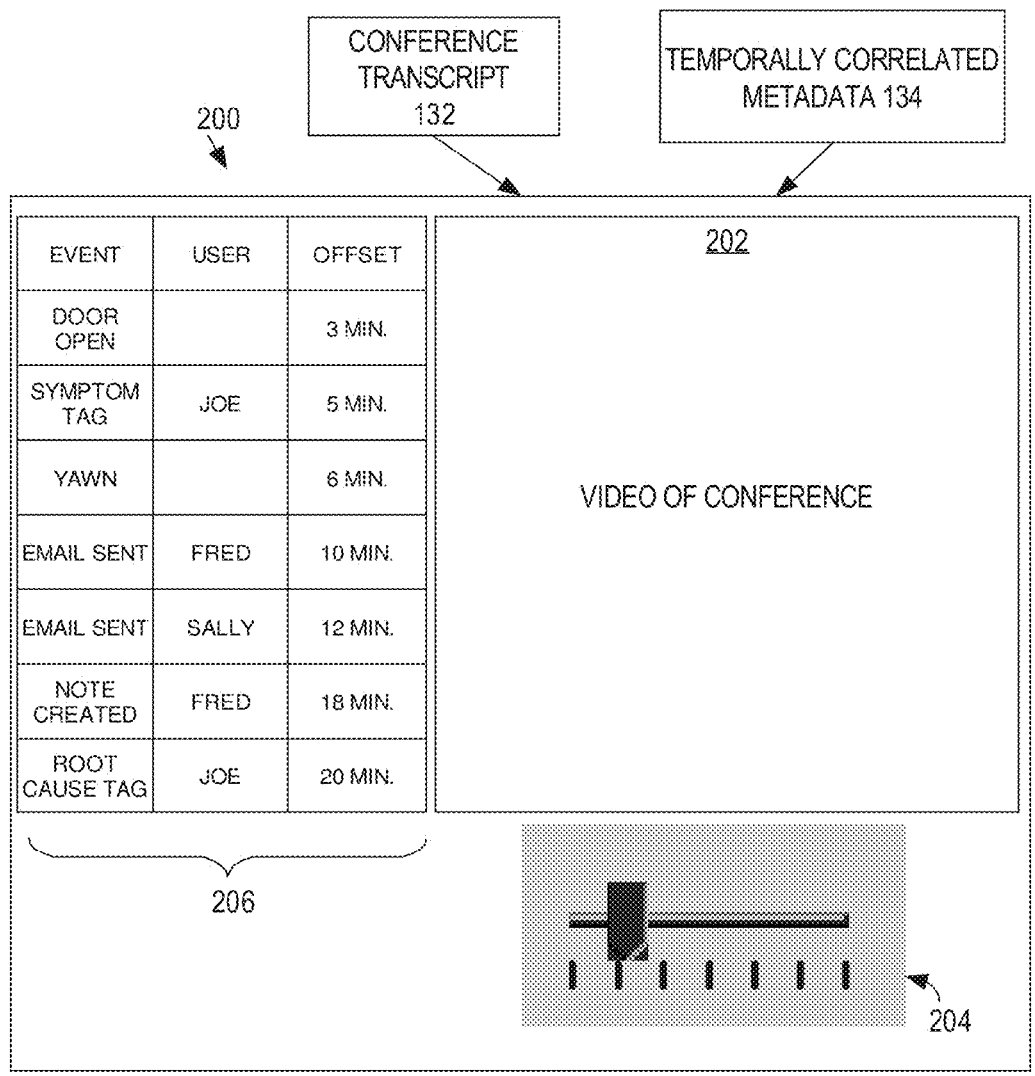
FIG. 2 is a block diagram of a system for playing back a recorded conference, according to an embodiment.

After transcoder 126 has created the temporally-correlated metadata 134 for the conference transcript 132, the temporally-correlated metadata 134 may be used to jump to the relevant portions of the conference transcript during playback. FIG. 2 is a block diagram of a system for playing back a conference for which temporally-correlated metadata 134 has been generated.

Referring to FIG. 2, it includes a playback system 200 capable of playing back the conference transcript 132. In the illustrated embodiment, a media player plays the video from a video conference in a playback region 202 of a display screen. The display screen includes a slider 204 that indicates the current playback location within the conference transcript. A user of playback system 200 may move the slider 204 to jump playback to particular points within the conference transcript. While an embodiment is illustrated in which the conference is a video conference, the techniques described herein apply equally to audio conferences in which no video component has been recorded. In such contexts, the playback system may not have region 202, or may display within region 202 a visual representation of the audio signal.

Using slider 204 to locate a particularly relevant portion of a conference may be a tedious process, particularly where the conference is long and the user does not generally know how far into the conference the interesting portion occurred. To facilitate finding the specific portions of the conference that are interesting, playback system 200 includes a user interface element 206 that lists the events identified in the temporally-correlated metadata 134. In the illustrated embodiment, user interface element 206 lists seven events. For each event, the user interface element 206 includes a field for indicating the type of event, the user associated with the event, and the temporal offset, into the conference, at which the event occurred.

In the situation illustrated in FIG. 2, the events include the opening of a door, the creation of two tags, the creation of a note, two email transmissions, and detection of a yawn. For some events, such as the yawn, the activity-detecting mechanism was not able to identify the particular user responsible for the activity, so no user is listed in the interface element 206.

It should be noted that the specific fields illustrated in interface element 206 are merely examples of the types of fields that may be displayed for the activities that were captured during the conference. The type of information that is captured for each activity may change from activity to activity, and from implementation to implementation. Consequently, the fields that are displayed in interface element 206 may also vary from activity to activity and from implementation to implementation.

According to one embodiment, the events listed in interface element may be sorted, organized, and filtered, as desired by the user. For example, the user may only be interested in what Joe was doing during the conference. Under these circumstances, the user may filter the event listing to include only those activities performed by Joe. On the other hand, the user may only be interested in certain types of events, such as the out-of-band transmission of email messages. Under these circumstances, the user may filter the event listing to include only events related to email.

In the illustrated embodiment, the event listing in interface element 206 is sorted based on the time, during the conference, at which the event occurred. However, the user may alternatively sort the listing by user or by type of event. A user may specify filters across multiple dimensions, and specify two or more fields for sorting. For example, the user may specify that the event list should include only email operations that occurred within the first five minutes of the conference, or only root cause tags created by system administrators (which may include Joe and Sally but not Fred).

Event-Based Jumping

According to one embodiment, rather than merely list the events that occurred during a conference, playback system 200 has logic for automatically jumping to the location, within the conference transcript, that temporally corresponds to a selected event. For example, a user may select the event, within interface element 206, that corresponds to the yawn. In response, playback system 200 causes the media player to jump to the location 6 minutes into the conference in which the yawn occurred. In a typical implementation, such a jump will cause region 202 to display an image that occurs at that location within the conference transcript 132, and slider 204 will be updated to indicate the new playback position.

How playback system 200 determines the location, within the conference transcript, to jump to for a particular event depends on the type of information that was stored to temporally correlate the metadata with the conference transcript 132. For example, if temporally-correlated metadata 134 uses timestamps, then the conference transcript is searched for a timestamp that matches the timestamp associated with the selected event. On the other hand, if temporally-correlated metadata 134 uses byte offsets, then the byte offset associated with the selected event is used to identify the location, in the conference transcript, at which to begin playback.

Playback Web Page

In one implementation, the playback system 200 presents to the user a playback web page that is used for displaying the recorded information back to users. In one embodiment, the playback web page includes a media player linked to a feed from a playback service. The media player may have standard controls (play button, pause button, progress bar, etc). Initially, the current playback position of the feed may be the beginning of the conference transcript. However, while playing back the stream from the feed, the media player shows the annotations inserted by the transcoding service.

In one embodiment, the playback web page displays the FAL generated for the conference. In addition, the playback web page displays APRL entries, and provides controls that allow a user to (a) select an entry, and (b) submit a "jump request" to jump to the offset taken from the selected entry. For example, each entry may include a link. When user clicks on the link for an entry, a jump request is sent to the Playback Service, which moves the current feed position to the offset associated with the selected entry.

Multi-Session Conferences

As explained above, a conference can be durable. In one embodiment, conferences are represented by folders in a content management repository. In one embodiment, such a conference folder can be contained by a workspace, which can also contain other folders such as a document library, message inbox, forums, calendars, and task lists, etc., to provide a context or scope for the conference sessions, conference activity streams, and out of band activity streams. Because conferences are durable, multi-session conferences are possible. Specifically, in one embodiment, the conferencing service provides a mechanism by which a user may indicate that a particular conference session is to be treated as part of a conference for which one or more previous sessions have already been recorded. Consequently, conferences can be started and stopped one day and resumed at a different time on another day.

According to one embodiment, all recordings of one or more sessions of a conference are archived in the same folder representing the durable conference. For example, in a customer support scenario, a conference/folder can be provisioned for each customer service request (SR). The same conference can be used for all interactions with the customer related to an SR until the SR is fully resolved or closed. The activities that are captured for indexing into the conference recordings of one or more SR resolution sessions of a SR conference may show, for example escalation events.

Indexing Conferences

According to an embodiment, conferences are indexed based on the activity streams captured during the conferences. Any number of indexes can be generated based on the activity streams. For example, conferences may be indexed based on the types of activities that occurred, the users who were involved in those activities, the artifacts that were involved in the activities, the content of those artifacts, etc. Regardless of the type of information from the activity stream upon which an index is built, the index may indicate not only which conference is associated with each index entry, but also an offset into the conference, at which the activity associated with the entry occurred.

Such indexes may facilitate searches, for example, to determine "all instances when somebody yawned while Joe was giving a presentation". In this example, a conference recording search engine may use one index to determine all intervals in all conferences in which Joe was the presenter, and use another index to determine all instances where people yawned in conferences. By finding the intersection of those two result sets, the search may be answered. The answer may take the form of a list of entries, each of which may have a link. By selecting the link, a user may automatically cause the playback service to load the corresponding conference, and to jump to the position in the conference at which the yawn occurred.

Rich Search Results Example

According to one embodiment, the techniques described herein may be used to improve search results. For example, assume a content search results in a significant number of artifacts that are part of the activity stream attached to a conference. Under these circumstances, the search engine may include in the search results the conference recording itself, since the conference is probably relevant if many of the artifacts involved in the conference were also relevant. Instead of or in addition to including the conference in the search results, the search engine can present to the user a conference snippet for each artifact in the search results. The specific snippet that is presented for each artifact is selected based on the temporal correlation between the conference recording and the timestamp of the activity, within the conference, that involved the artifact.

For example, consider an online learning system where in an instructor is teaching Java Performance tuning. During the conference, the instructor discusses about heap dump analysis from time T1 to T2 with the help of a presentation (document). Thus any search result by an end user of such system for "heap dump analysis java" would normally return the presentation. However, given the activity stream(s) that refers to this document, the search server can present the conference recording starting at T1 (consider the video is automatically forwarded to T1). This is a significant improvement in that the end user now is shown directly that part of the video stream that he/she is looking for and does not have to scroll through a full hour of video.

User Engagement Computation Example

In addition to facilitating searches for relevant conference snippets, the activity stream associated with a conference may be used to generate useful derivative information. For example, the techniques described herein may be used with an online discussion forum for classroom discussions of a particular course. A teacher or teaching institution may find it useful to know how engaged individual students are in the course. In this context, user engagement is a measure of the level of participation of a user in a specific course.

Under these circumstances, the user engagement of each individual user can be computed by analyzing the activity stream of the user for the conferences relevant to the course. Specifically, a user's engagement in a particular course may involve summing the number of activities (such as post a question, post an answer) that were generated for the user during conferences for that course.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
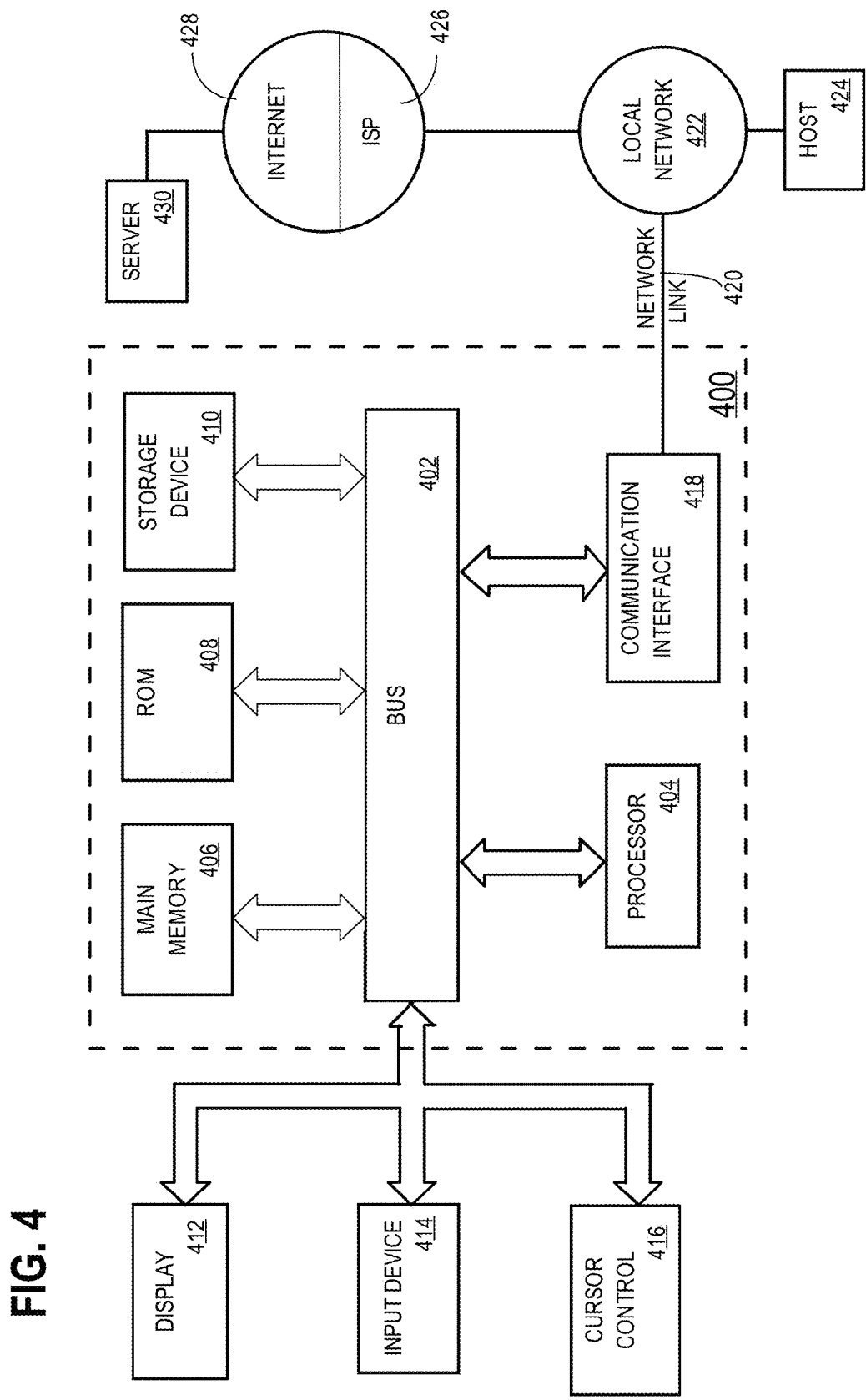
FIG. 4 is a block diagram of a computer system upon which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   obtaining a recording of a conference;
   obtaining at least a first activity record created by a first source involved in the conference;
   wherein the first activity record conveys information about a first activity that occurred at a first time period during the conference;
   obtaining at least a second activity record created by a second source that is not involved in the conference and is not involved in the recording of the conference;
   wherein the second activity record conveys information about a second activity that occurred at a second time period during recording of the conference;
   generating and maintaining a conference record of the conference;
   wherein the conference record:
      associates the first activity record and the second activity record with the conference; and
      temporally correlates the recording of the conference, the first activity record, and the second activity record;
   wherein the method is performed by one or more computing devices.

2. The method of claim 1, further comprising determining relevance of the second activity to the conference; and wherein the second activity record is associated with the conference in response to the second activity being determined to be relevant to the conference.

3. The method of claim 1, further comprising automatically differentiating activities relevant to the conference and activities irrelevant to the conference.

4. The method of claim 3, wherein automatically differentiating activities relevant to the conference comprises classifying an activity as relevant to the conference when the activity:
   involves an action taken on an item included in a conference workspace corresponding to the conference,
   involves a participant of the conference, and
   occurs in a time period during the conference.

5. The method of claim 4, wherein the action taken on the item includes one or more of the following actions involving the item: a load, a create, an update, a delete, or a move.

6. The method of claim 1, wherein at least one of the first or second activity comprises an activity associated with a presenter of the conference.

7. The method of claim 1, wherein at least one of the first or second activity comprises an activity associated with a participant of the conference.

8. A non-transitory storage medium storing instructions which, when executed by one or more processors, cause:
   obtaining a recording of a conference;
   obtaining at least a first activity record created by a first source involved in the conference;
   wherein the first activity record conveys information about a first activity that occurred at a first time period during the conference;
   obtaining at least a second activity record created by a second source that is not involved in the conference and is not involved in the recording of the conference;
   wherein the second activity record conveys information about a second activity that occurred at a second time period during recording of the conference;
   generating and maintaining a conference record of the conference;
   wherein the conference record:
      associates the first activity record and the second activity record with the conference; and temporally correlates the recording of the conference, the first activity record, and the second activity record.

9. The non-transitory storage medium of claim 8, wherein the instructions, when executed by the one or more processors, further cause determining relevance of the second activity to the conference; and wherein the second activity record is associated with the conference in response to the second activity being determined to be relevant to the conference.

10. The non-transitory storage medium of claim 8, wherein the instructions, when executed by the one or more processors, further cause automatically differentiating activities relevant to the conference and activities irrelevant to the conference.

11. The non-transitory storage medium of claim 10, wherein automatically differentiating activities relevant to the conference comprises classifying an activity as relevant to the conference when the activity:
 involves an action taken on an item included in a conference workspace corresponding to the conference,
 involves a participant of the conference, and
 occurs in a time period during the conference.

12. The non-transitory storage medium of claim 11, wherein the action taken on the item includes one or more of the following actions involving the item: a load, a create, an update, a delete, or a move.

13. The non-transitory storage medium of claim 8, wherein at least one of the first or second activity comprises an activity associated with a presenter of the conference.

14. The non-transitory storage medium of claim 8, wherein at least one of the first or second activity comprises an activity associated with a participant of the conference.

15. A system comprising:
 at least one memory including a recording of a conference, a first activity record, and a second activity record;
 wherein the first activity record is created by a first source involved in the conference, the first activity record conveying information about a first activity that occurred at a first time period during the conference;
 wherein the second activity record is created by a second source that is not involved in the conference and is not involved in the recording of the conference, the second activity record conveying information about a second activity that occurred at a second time period during recording of the conference;
 at least one transcoding mechanism including at least a processor, the transcoding mechanism configured to generate a conference record of the conference, wherein the conference record:
  associates the first activity record and the second activity record with the conference, and
  temporally correlates the recording of the conference, the first activity record, and the second activity record,
 and the transcoding mechanism configured to maintain the conference record in the at least one memory.

16. The system of claim 15, wherein the at least one transcoding mechanism determines relevance of the second activity to the conference and the conference record is generated in response to the second activity determined to be relevant to the conference.

17. The system of claim 15, wherein the at least one transcoding mechanism automatically differentiates activities relevant to the conference and activities irrelevant to the conference.

18. The system of claim 17, wherein the at least one transcoding mechanism classifies an activity as relevant to the conference when the activity:
 involves an action taken on an item included in a conference workspace corresponding to the conference,
 involves a participant of the conference, and
 occurs in a time period during the conference.

19. The system of claim 15, wherein at least one of the first or second activities comprises an activity associated with a presenter of the conference.

20. The system of claim 15, wherein at least one of the first or second activities comprises an activity associated with a participant of the conference.

* * * * *